Nov. 4, 1947.                J. HANDLEY                 2,430,113
                REGISTERING AND DISPLAYING APPARATUS
                        Filed July 7, 1944
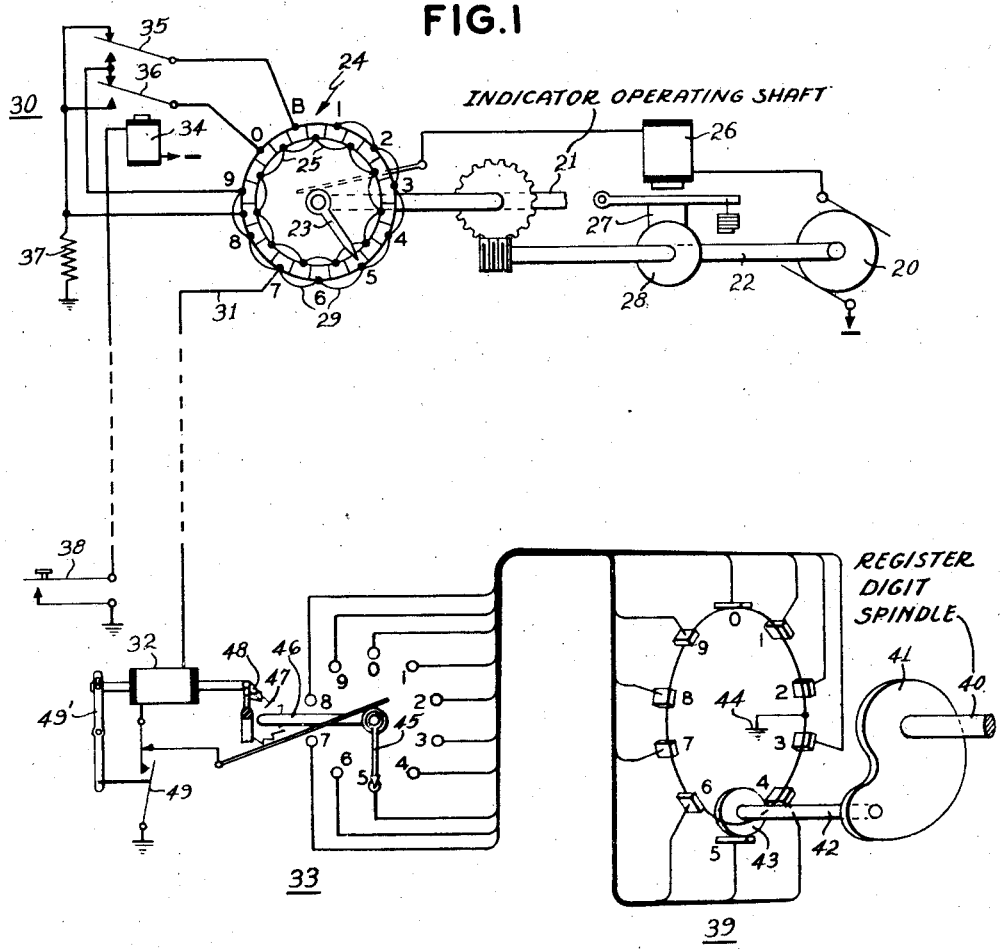
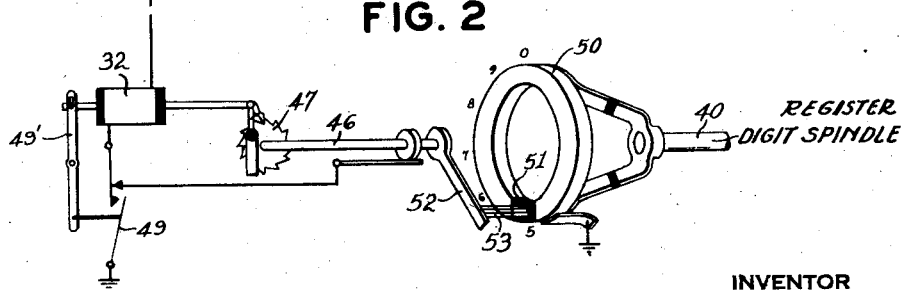
INVENTOR
JOHN HANDLEY
BY
Dennis, Edmonds, Morton and Barrows
ATTORNEYS Patented Nov. 4, 1947

2,430,113

UNITED STATES PATENT OFFICE 2,430,113

REGISTERING AND DISPLAYING APPARATUS

John Handley, London, England, assignor to The Union Totalisator Company Limited, Glasgow, Scotland, a company of Great Britain Application July 7, 1944, Serial No. 543,941
In Great Britain May 11, 1943

6 Claims. (Cl. 177—351)

1

This invention relates to improvements in electro-mechanical registering or counting and displaying apparatus, and is concerned with a switch device for controlling a public indicator so that the indicator follows the movement of a register or counter and displays the same numerical total when the counter comes to rest.

The present invention particularly comprises an improvement upon the control circuit of prior Patent No. 2,043,511 which discloses a public indicator for indicating, as an example, the total value of transactions registered at any time by a register at a remote point. According to the disclosure of this patent at least ten control wires were used for connecting the selector switch to the remote control. The improvement provided by the present invention includes a control circuit which does not require the numerous connecting wires which previously had to be carried for long distances, to connect up and control a public indicator from the operation of the register.

The improved control apparatus of the present invention is a mechanism for controlling the movement of an indicator to a plurality of positions corresponding to the positions assumed by a register, comprising a distributor switch movable with the indicator for alternately making and breaking a circuit, switching means having one element positioned by said register, a motor for operating the distributor switch, an electromagnetic means for actuating another element of said switching means step by step, and a circuit including said motor, said distributor switch, said electromagnetic means, and said switching means.

In a more specific sense, the control circuit of the present invention greatly simplifies the control and operation of a public indicator from a register, for example, at a remote location. The public indicator is operated by an electric motor. Current is passed from a current supply through this motor to a rotary switch arm, of a distributor switch, driven by the motor over a contact assembly of eleven segments, the contacts being separated by eleven intermediate or alternating segments which are connected up together or in common. The contact segments representing numerals 1 to 9 are also connected up in common and connected by a control wire to an electromagnet of a hunting switch located, for example, at the place where the register is located. The hunting switch is so arranged that it moves to a grounded position which is controlled by the operation of the register, which displays a corresponding digit

2 or numeral. The operation of the hunting switch continues until it assumes the same position as the register digit when the connection to ground is broken and the circuit interrupted, whereupon the hunting switch arm and the indicator come to rest simultaneously.

The improved control system according to the invention is illustrated in the accompanying drawings in which:

Fig. 1 is a conventional circuit diagram of the control apparatus embodying the invention and showing its association with the register and indicator.

Fig. 2 is a detailed sketch showing a modification of the apparatus shown in Fig. 1.

Referring to Fig. 1 of the drawings, an electric motor 20 drives a public indicator operating shaft 21 by means of suitable gearing as indicated and a shaft 22 operated directly by the motor. The motor 20 also drives a rotary switch arm 23 mounted on the shaft 21, of an indicator distributor or switch 24, having a circular contact assembly including eleven segments marked zero to 9 and B for blank, respectively, and eleven intermediate or alterating contact segments which are wired in common by connecting wires 25, as shown. Current is passed from a current source, as shown, through the motor 20, for its actuation, then through a solenoid or electromagnet 26 of a spring loaded brake 27 bearing on a brake drum 28 attached to the shaft 22. From the electromagnet 26 the current passes to the indicator switch arm 23 to supply current to the segments of the switch 24 as the arm 23 is rotated.

The contact segments marked 1 to 9 of the switch 24 are connected in common by wires 29, and to the lower fixed contact of the upper switch of a relay 30. The segments 1 to 9 are also connected by a control wire 31 to an electromagnet 32 of a stepping and hunting switch 33 which is associated with the register which controls the operation of the indicator driven by the motor 20.

The relay 30 is provided to restore the cam shaft 21 to B or a blank setting, this relay including a solenoid 34 actuating two change-over switch elements 35 and 36 wired to the segments B and zero, respectively, of the switch 24. The elements 35 and 36 may be biased to the position shown. The upper fixed contact of the upper switch and the lower fixed contact of the lower switch are wired, as shown, to the commonly connected intermediate contact segments of the indicator switch 24. These segments are also wired to ground, as shown, by a balancing resistance 37. The relay 30, as shown in Fig. 1, is a latching relay operated, for example, from the place where the register is located by a blanking key 38 to change over the switch elements 35 and 36 to provide a blank setting for the indicator. Further details concerning the operation of the relay 30 may be obtained by reference to Patent No. 2,043,511.

Since the indicator is controlled by the operation of the register, the hunting or stepping switch 33 is located at the place where the register is situated and connected to a circular group of contacts numbered zero to 9 of a switch 39 controlled by the register. The switch 39 is operated by the rotation of a register digit disc spindle 40 carrying a cam 41 comprising a portion of the register mechanism. The cam 41 carries a pin 42 offset with respect to the spindle 40 and on which is mounted a roller 43. The circular row of contacts number zero to 9 of the switch 39 are normally grounded, as indicated to a ground 44. When the register spindle 40 is rotated so that the digit disc attached thereto exhibits a different numeral, the roller 43 breaks the connection of that particular contact of the switch 39 to ground.

Each of the numbered contacts of the switch 39 are connected respectively to similarly numbered contacts of the stepping or hunting switch 33. The switch 33 includes a step-by-step switch arm 45 mounted on a shaft 46 which also carries a spur wheel 47 having ten spurs corresponding to the numbered contacts of the switch, the wheel 47 being moved step by step as the magnet 32 is energized by a pawl 48 of the type shown, for example. The switch arm 45 is electrically connected to the circuit of the electromagnet 32, as shown.

The control apparatus illustrated in Fig. 1 of the drawings shows the arms of the switches 24 and 33 on the contact corresponding to the numeral 5. In switch 39 the roller 43 has broken the contact corresponding to the numeral 5, so that the apparatus is at rest with the numeral 5 showing both on the register digit disc and on the indicator panel corresponding thereto. When the roller 43 breaks the circuit the entire apparatus comes to a stop and the electromagnet 26 is deenergized so that the brake 27 arrests the shafts 21 and 22 and the arm 23 with precision. The brake is automatically released when the magnet 26 is energized, so that the motor 20 can drive the indicator and the arm 23.

In the operation of the apparatus shown in Fig. 1, if we assume that the register spindle 40 is actuated so as to move the roller 43 to disconnect contact number 6 of the switch 39, the contact 5 closes and becomes alive, and current flows through the motor 20, the switch arm 23, the wire 31 and the solenoid 32, to actuate the switch arm 45 to the contact of numeral 6. From the solenoid 32 current of course flows through the switch arm 45 of the switch 33 to the contact of numeral 5 of the switch 39 and to ground 44.

The control apparatus also includes a make-before-break switch 49 associated with and operated by the magnet 32, as for example, by the arrangement 49', so that once the switch 49 is operated, it remains "made" to ground until the arm 23 passes on to one of the intermediate segments and releases it by deenergizing the solenoid 32. This prevents the register from interrupting the register switch 39 without giving the indicator enough time to follow when providing current for a very short duration in passing a contact or insulated sector very quickly.

It will be noted that in the operation of the switch 24 as described, the current flowing through the line 31 energizes the motor 20 and moves the arm 23 first to the intermediate segment between the segments 5 and 6. This of course breaks the circuit through the solenoid 32 and opens the switch 49. However, the motor 20 is not stopped because the intermediate segments of the switch 24 are connected to ground through the resistance 37 so that the switch arm 23 continues to the segment 6 from which it can only be moved in response to the rotation of the digit spindle 40. The balancing resistance 37 between the intermediate contact segments and the ground serves to maintain a balanced voltage in the motor 20 when the hunting switch magnet or solenoid 32 is deenergized. It will thus be seen that as the indicator spindle 40 rotates the magnet 32 is energized when the switch arm 23 is in contact with each segment zero to 9, and is deenergized as this arm contacts the intermediate contact segments, the blank contact segment B and its adjacent intermediate contact segments acting as a single intermediate contact segment, except when blank is displayed before the indicator has commenced to move. In Fig. 1 it will be noted that the B segment is normally connected to ground through the switch element 35.

Fig. 2 of the drawings shows a modified form of control arrangement in which the stepping switch is mounted adjacent the digit spindle 40 of the register. In this construction a brass disc or ring 50 mounted as illustrated, for example, on the spindle 40, insulated therefrom and always grounded, forms a contact member, and is provided with an insulated sector 51. In this form of the invention, the electromagnet 32 in actuating the wheel 47 and shaft 46 rotates a wiper 52 carrying a brush 53 on the face of the disc or ring 50 and completes the circuit until the wiper 52 engages the insulated sector 51, which brings the stepping switch and consequently the indicator mechanism, including the motor 20, the shaft 21 and arm 23, to rest.

The relationship of the modified construction shown in Fig. 2 to the apparatus of Fig. 1, will be understood when it is realized that in Fig. 1 the roller 43 moves to the next position in response to the rotation of the register digit spindle 40 and the step-by-step switch arm 45 is grounded to the ground 44 which causes the switch 24 and the indicator of the apparatus to operate until a wire is marked which the roller 43 has taken off the ground 44, which brings the indicator of the apparatus to rest.

While the control apparatus shown in Fig. 1 eliminates numerous wires between the switches 24 and 33, that shown in Fig. 2 also eliminates the ten wires between the switches 33 and 39, although these latter wires may be very short. As the ring 50 rotates with the spindle 40 its insulated segment 51 moves from one numeral position to another, and the wiper 52 is connected to ground, which causes the switch 24 and indicator to operate until the ring 50 stops and the wiper 52 moves onto the insulated segment 51 to break the circuit to ground, thereby bringing the indicator to rest in the manner described in connection with Fig. 1 of the drawings.

In this operation, it will be noted, for example, that if the register spindle 40 moves the insulated sector from the position 5, as shown, to the position of the numeral 6, and stops, the wiper 52 is immediately contacted by the brass ring 50 to energize the motor 20 and the electromagnet 32, to move the arms 23 and 45 to the position of the numeral 6, where the apparatus stops until the ring 50 is rotated again by the register.

I claim:

1. A mechanism for controlling the movement of an indicator to a plurality of positions corresponding to the positions assumed by a register, comprising a distributor switch movable with the indicator for alternately making and breaking a circuit, switching means having one element positioned by said register, a motor for operating the distributor switch, an electromagnetic means for actuating another element of said switching means step by step, and a circuit including said motor, said distributor switch, said electromagnetic means, and said switching means.

2. A mechanism as defined by claim 1 in which the motor drives a shaft for operating the distributor switch, a spring-loaded brake member normally holding said shaft against rotation, and an electromagnetic means included in said circuit for lifting the brake member when current is passed through said motor.

3. A mechanism as defined by claim 1 in which the circuit through the electromagnetic means includes a make-before-break switch actuated by the electromagnetic means.

4. A mechanism as defined by claim 1 wherein the element positioned by the register comprises a conducting ring having an insulated sector and the element of the switching means actuated by the electromagnetic means comprises a conducting arm cooperating with the conducting ring.

5. A mechanism for controlling the movement of an indicator to a plurality of positions corresponding to the positions assumed by a register, comprising an electric circuit, a distributor switch for alternately making and breaking said circuit and having a conducting arm movable with the indicator, a motor for moving said arm, switching means including a movable element positioned by the register and a movable conducting arm, and means including an electromagnet for moving the conducting arm of said switching means step by step, said circuit including said motor, said distributor switch including its conducting arm, said electromagnet, and said switching means including its conducting arm.

6. A mechanism for controlling the movement of an indicator to a plurality of positions corresponding to the positions assumed by a register, comprising an electric circuit, a distributor switch for alternately closing and opening said circuit and having a conducting arm movable with the indicator, a motor for moving said arm, a stepping switch mechanism including a conducting ring and a movable conducting arm cooperating therewith, said conducting ring having an insulated sector and being rotatable about its axis by the register, and mechanism including an electromagnet for moving the conducting arm of said stepping switch mechanism step by step on said ring, said circuit including means for conducting current through said motor, said distributor switch including its conducting arm, said electromagnet, and through the conducting arm and ring of the stepping switch mechanism.

JOHN HANDLEY.

REFERENCES CITED

The following references are of record in the file of this patent:

UNITED STATES PATENTS

| Number | Name | Date |
|---|---|---|
| 1,834,800 | Petch et al. | Dec. 1, 1931 |

FOREIGN PATENTS

| Number | Country | Date |
|---|---|---|
| 257,951 | Germany | Mar. 31, 1913 |
| 566,149 | Great Britain | Dec. 15, 1944 |